United States Patent
Phenner et al.

(10) Patent No.: US 8,401,974 B2
(45) Date of Patent: *Mar. 19, 2013

(54) METHOD, SYSTEM, AND GRAPHIC USER INTERFACE FOR ENABLING A CUSTOMER TO ACCESS A MEDIA FILE

(75) Inventors: Chris Phenner, New York, NY (US); Lasse Hamre, New York, NY (US); Mike Park, New York, NY (US)

(73) Assignee: Clear Channel Management Services, Inc., San Antonio, TX (US)

( * ) Notice: Subject to any disclaimer, the term of this patent is extended or adjusted under 35 U.S.C. 154(b) by 11 days.

This patent is subject to a terminal disclaimer.

(21) Appl. No.: 12/417,575

(22) Filed: Apr. 2, 2009

(65) Prior Publication Data

US 2010/0257005 A1 Oct. 7, 2010

(51) Int. Cl.
*G06Q 20/00* (2012.01)

(52) U.S. Cl. ........... 705/68; 705/50; 705/64; 705/65; 705/412; 705/16; 705/39; 705/17; 705/41; 235/379; 902/25; 902/26; 902/27; 902/28; 902/29

(58) Field of Classification Search ............... 705/68
See application file for complete search history.

(56) References Cited

U.S. PATENT DOCUMENTS

2004/0015408 A1* 1/2004 Rauen et al. ............... 705/26
2008/0109306 A1* 5/2008 Maigret et al. ............. 705/14

OTHER PUBLICATIONS

Mobile Content Delivery (© Copyright 2005 EMC Documentum, MobileAware and BEA.) Retrieved online Nov. 13, 2012.*

* cited by examiner

*Primary Examiner* — James A Reagan
(74) *Attorney, Agent, or Firm* — Garlick & Markison; Edward J. Marshall

(57) ABSTRACT

A method, system, GUI, apparatus, and computer readable media for enabling a customer to access to a media file uploaded by a user are provided. A user profile may be generated using received login and profile information. The user profile may be hosted on, for example, a web site, SMS/MMS gateway, and a WAP site. A media file may be received from the user and may be upload to the user profile. The media file may be associated with a user account. A request to access the media file may be received from a customer. An account associated with the customer may be updated to indicate their requested access to the media file. The customer may then be enabled to access the media file. The user's account may be updated to indicate the transaction.

17 Claims, 16 Drawing Sheets

505 thumbplay open  Sign out

| DASHBOARD | ARTIST PROFILE | RINGTONES | GRAPHICS | STORE WIDGET | GET BANNERS | PROMO LINKS | REPORTS | ACCOUNT | HELP |

Sweetheart Attack Ringtones  ~ 510     535 ~ [ + Add A Ringtone ▶ ]

1) Upload an MP3
2) Click "publish" next to each ringtone as they appear on the list below.
   Only published ringtones appear in your profile, widget and sales pages.     } 515
3) Use your Store Widget and Promo Links to promote your new ringtones.

520

| UNPUBLISHED RINGTONES | | |
|---|---|---|
| Cover Art | Title | Genre |

You have no unpublished ringtones.

- - - - - - - - - - - - - - - - - - - - - - - - - - - - - - - - - - - -

525

| RINGTONES FOR SALE ON THUMBPLAY | | | |
|---|---|---|---|
| Cover Art | Title | Genre | Promo Links |

| | I Used to Miss Someone | | [ View URL ▶ ] 530 | unpublish |

| | I Still Miss Someone | | [ View URL ▶ ] 530 | unpublish |

FIG. 5

METHOD, SYSTEM, AND GRAPHIC USER INTERFACE FOR ENABLING A CUSTOMER TO ACCESS A MEDIA FILE

BACKGROUND OF THE INVENTION

1. Field of Invention

This invention relates to a method, system, graphic user interface (GUI), apparatus, and computer readable media for enabling a customer to access a media file uploaded by a user to a hosted user profile.

2. Discussion of Related Art

Current media file downloading sources such as iTunes™ and Rhapsody™ offer customers the ability to purchase and download media files. Typically, these downloading sources receive media files from a recording industry representative and not from a user or artist. Once received, a media file may then be processed and uploaded to a website hosted by the downloading source so that they may be viewed and/or purchased by one or more customers. In this way, a user or artist is denied direct access to the downloading source. The lack of direct access to a downloading source causes considerable delay in the time it takes for a media file to get to market. This delay may, in turn, cost the user or artist valuable opportunities and financial benefits. Additionally, the lack of direct access to a downloading source denies a user or artist direct control over a media file they generate or are otherwise associated with.

Other websites, like MySpace.com™ and YouTube.com™, enable users to upload media content that may later be viewed by other users of the website. However, this content is not available for download and/or purchase by a viewing user.

SUMMARY

A method, system, graphic user interface (GUI), apparatus, and computer readable media for enabling a customer to access a media file uploaded by a user to a hosted user profile are provided. A user profile may be generated using login and/or profile information received from the user. The login and profile information may be received by, for example, a website, a short message service (SMS)/multimedia messaging service (MMS) gateway, and a wireless application protocol (WAP) site. A media file may be received from the user and may be upload to the user profile. The media file may be, for example, an MP3 file, a graphic file, a ringtone file, a document file, a game file, and a music file. The user profile may be hosted on, for example, a website, a short message service (SMS)/multimedia messaging service (MMS) gateway, and a wireless application protocol (WAP) site. In some embodiments it may be determined whether uploading the media file complies with one or more applicable copyright laws. This determination may be performed by a content delivery platform and content management system.

A user account may be generated and/or associated with a user with, for example, a subscription and purchase management system. The user account and/or the user profile may be stored in a database. A received media file may be uploaded to, for example, the user profile and/or host web site using, for example, a content delivery platform and content management system. The media file may be associated with the user account using, for example, a subscription and purchase management system.

A communication from a customer may be received via, for example, a website, a SMS/MMS gateway, and a WAP site. The communication may, for example, establish a connection between the customer and the via, for example, a website, a SMS/MMS gateway, and a WAP site. Information regarding a good or service may be provided to the customer in the form of, for example, an advertisement. A request to access the media file may be received from a customer via, for example, a website, a SMS/MMS gateway, and a WAP site. The customer may be associated with a customer account. The customer account may be with, for example, a host website, user profile, and/or financial institution. The customer account may be updated to indicate the communication and/or requested access to the media file. The customer may then be able to access the media file using, for example, content delivery platform and content management system. A user and/or customer account may be updated to indicate the customer access to the media file using, for example, a subscription and purchase management system.

In one embodiment, a unique identifier may be assigned to at least one of the user profile and the media file and a transaction related to at least one of the user profile and the media file may be cataloged using the assigned unique identifier. A statement may then be prepared for the user based on a cataloged transaction. The statement may include information regarding various transactions related to the user profile, an uploaded media file, and/or the host website including, for example, the status or cost of a transaction and/or any proceeds due to the user and may be prepared by, for example, the subscription and purchase management system.

On some occasions, a set of sales information and/or a set of promotional information may be provided to the user using, for example, content delivery platform and content management system. The set of sales information and/or the set of promotion information may be, for example, a widget, a link, and/or an application programming interface (API). A selection of at least one of the set of sales information and the set of promotional information may be received and the selected set of information may be added to the user profile. In one embodiment, the selected set of information may be modified. In yet another embodiment, the selected set information may be added to an application external to the user profile and/or host website.

In one embodiment, the media file may be stored in a digital library. The media file may be classified according to one or more categories according to, for example, a user profile associated with the media file. In some cases, information regarding the media file may be provided to a customer based on its classification.

A system and apparatus, wherein the system and apparatus are enabled to sell access to a media file uploaded by a user to a user profile hosted by a host website is also provided. The system and apparatus may include a network enabled to facilitate communication between a user and a server computer system. The system and apparatus may also include a server computer system enabled to receive login and profile information from the user, generate a user profile, host a user profile, receive a media file from the user, upload a media file to a user profile, assign a unique identifier to a media file and user profile, generate a user account, store a user profile, media file, and user account, associate a media file with a user account, provide a set of promotional and sales information, add a selected set of promotional and sales information to a user profile, receive a request to access a media file, update a customer account to reflect a request to access a media file, enable a customer to access a media file, catalog transactions, update a user account and prepare a statement for a user.

BRIEF DESCRIPTION OF DRAWINGS

The present invention is illustrated by way of example, and not limitation, in the figures of the accompanying drawings in which:

FIG. 4A is a screenshot of an exemplary page displaying a GUI for enabling a user to generate and/or modify a user profile, consistent with an embodiment of the present invention;

FIG. 4C is a screenshot of a page showing an exemplary GUI 455 for providing a user with a mechanism to access a user profile and/or information associated with a user profile, consistent with an embodiment of the present invention;

FIG. 4B is a screenshot of a page showing an exemplary user's profile, consistent with an embodiment of the present invention;

FIG. 5 is a screenshot of a page showing an exemplary GUI for enabling a user to generate, modify, and/or sell a ringtone media file, consistent with an embodiment of the present invention.

DETAILED DESCRIPTION OF THE INVENTION

Figure 1A:
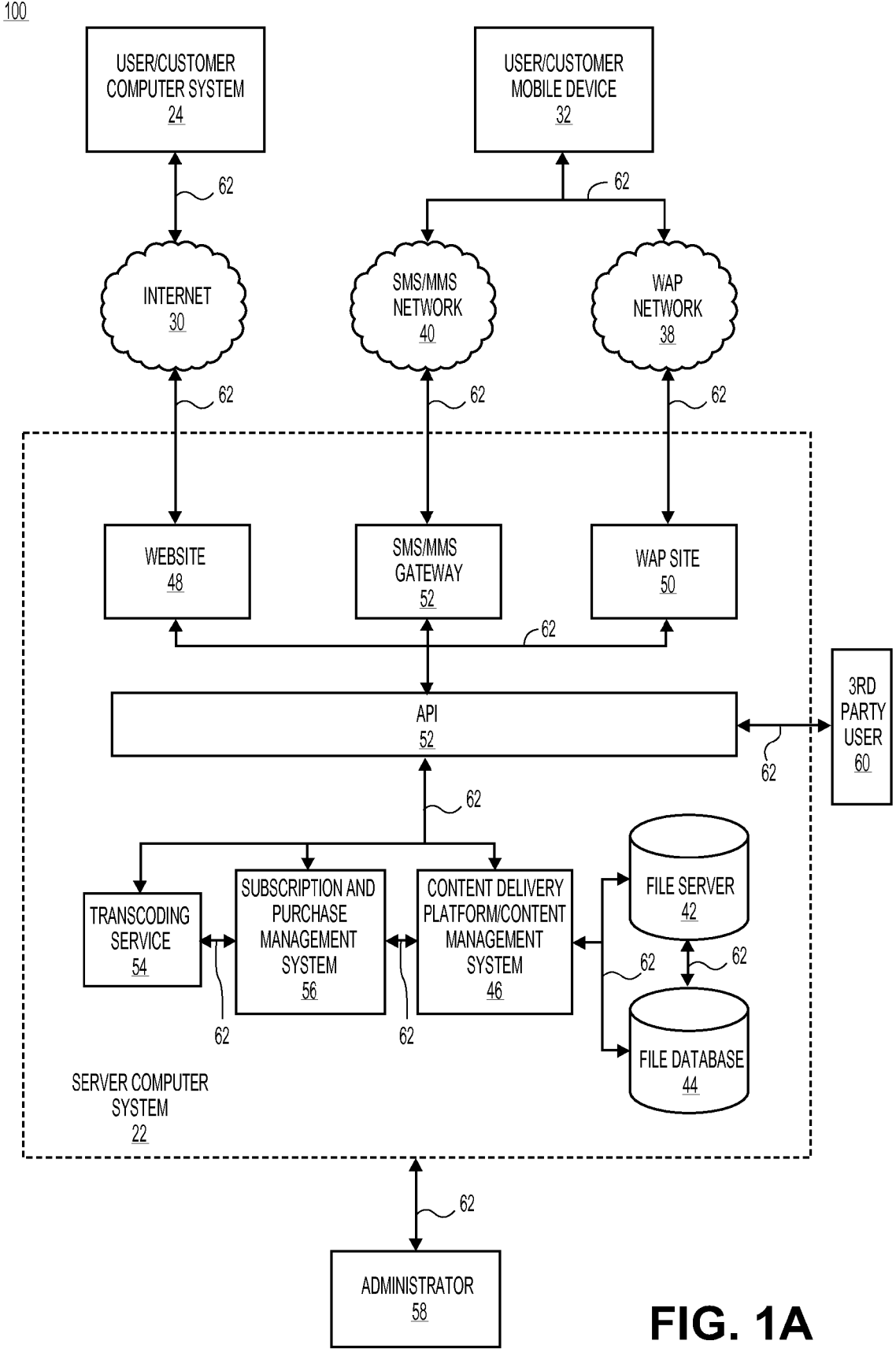
FIG. 1A is a block diagram illustrating a network system in which aspects of the invention are manifested, consistent with an embodiment of the present invention.

FIG. 1A is a block diagram illustrating a network system 10 for enabling a customer to access a media file uploaded by a user to a hosted user profile. System 100 includes a user computer system 24, a user mobile system 32, the Internet 30, a short message service (SMS)/multimedia messaging service (MMS) network 40, a wireless application protocol (WAP) network 38, a server computer system 22, a website 48, a SMS/MMS gateway 52, a WAP site 50, an application programming interface (API) 52, a transcoding service 54, a subscription and purchase management system 56, a content delivery platform and content management system 46, a file server 42, a file database 44, an administrator 58, a third party user 60, and communication links 62.

User computer system 24 may communicate with server computer system 22 via a web site, such as web site 48, over a network, such as Internet 30. User mobile device 32 may communicate with a SMS/MMS gateway, such as SMS/MMS gateway 52 via, for example an SMS/MMS network such as SMS/MMS network 40. User mobile device 32 may also communicate with a WAP site such as WAP site 50 via a WAP network 38 such as WAP network 38.

Server computer system 22 may include a file store in the form of file server 42 and a data store in the form of file database 44. File database 44 may store one or more media files and/or libraries of media files. A library of media files stored by file database 44 may include media files improted directly from, for example, a media distribution company or a record label like Sony Music™ or Universal Studios™. File database 44 may be in communication with file server 42. API 52 may be a set of instructions, protocols, methods, and/or functions that enable system 100 to perform a request from any of the components of system 100.

Content delivery platform and management system 46 may, for example, classify and/or index media files such as ringtones (reduced media content), full-track content, games, wallpaper, graphics, MP3s, and media files using one or more categories. Content delivery platform and management system 46 may provide information to a customer regarding a media file based on, for example, it's classification and/or indexing. Media files to be indexed may be from, for example, a file server such as file server 42. Indexed media files may be stored in, for example, a structured manner that may enable accessing the media file and/or downloading the indexed media file to a website like website 48, a WAP site like WAP site 50, a SMS/MMS gateway like SMS/MMS gateway 52, and/or a transcoding service like transcoding service 54. Indexed media files may be stored in a database like file database 44.

Subscription and purchase management system 56 may include instructions that may enable the managing of subscriptions to, for example, a host website, a user profile, and/or a media file. Subscription and purchase management system 56 may also include instructions that may enable the managing of the purchase of a subscription and/or access to a media file. Subscription and purchase management system 56 may enable the updating of a customer account to indicate, for example, the customers access of a website like website 48, a WAP site like WAP site 50, a SMS/MMS gateway like SMS/MMS gateway 52, a user profile, or a media file. Subscription and purchase management system 56 may also enable providing a customer with access to a good or service when the customer communicates with, for example, a website like website 48, a WAP site like WAP site 50, a SMS/MMS gateway like SMS/MMS gateway 52.

Transcoding service 54 may prepare communication suitable for transmission over internet 30, WAP network 38, and/or SMS/MMS network 40. Administrator 58 may be any administrator of server computer system 22 and may provide instructions to one or more components of server computer system 22. Third party user 60 may be any third party not in communication with to the website 48, SMS/MMS gateway 52 and WAP site 50. Third party user 60 may be enabled to access API 52 via, for example, a widget, API, or link external to server computer system 22.

Communication between one or more components of system 100 may be made via a communication link like communication link 62. Communication links 62 may be any appropriate communication link and may be wired or wireless.

Figure 1B:
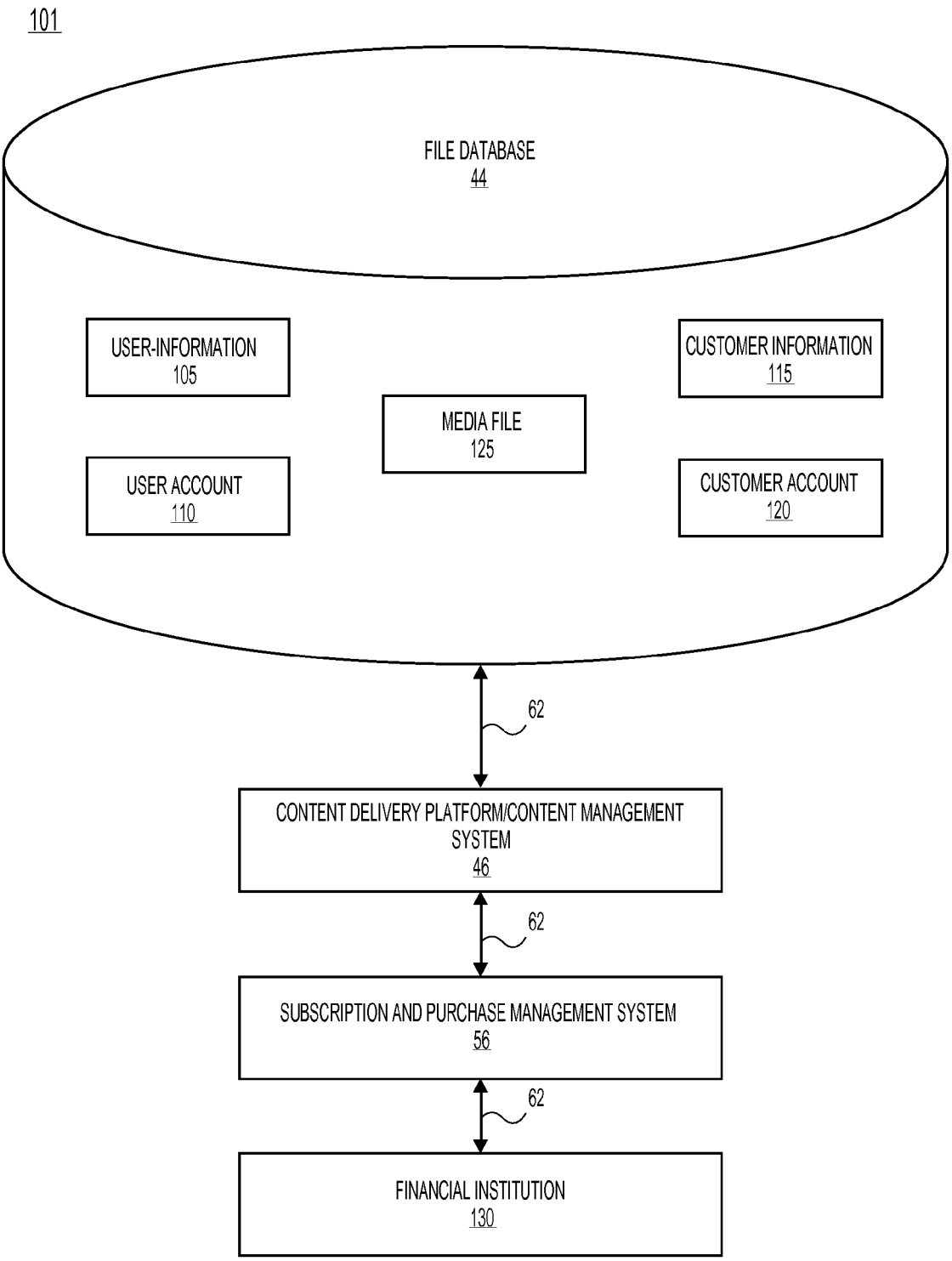
FIG. 1B is a block diagram illustrating a network system enabled to update a user and/or customer account, consistent with an embodiment of the present invention.

FIG. 1B is a block diagram illustrating a network system 101 enabled to update a user and customer account. System 101 may include file database 44, subscription and purchase management system 56, content delivery platform and content management system 46, a financial institution 130, and communication links 62. File database 44 may include, for example, a user information module 105, a user account module 110, a customer information module 115, a customer account module 120, and a media file 125.

Financial institution 130 may be any entity capable of conducting financial transactions such as an electronic or paper funds transfer. Exemplary financial institutions include banks, credit card companies, and PayPal™. Financial institution 130 may be able to access, withdraw, and/or deposit funds related to user account 110 and/or customer account 120. Financial institution 130 may also be able to update a user account module 110 and/or customer account module 120 to reflect, for example, a transaction.

User information module 105 may include information regarding a user. Exemplary information includes login information such as a password and user identification and/or a user profile and/or information associated with a user profile and/or media file. A user profile may include, for example, information regarding the user's interests, a musical group that he or she belongs to, a genre of art that he or she contributes to, and/or information regarding media files he or she has uploaded to the user profile. User information module 105 may be in communication with, for example, user account module 110 and/or media file module 125.

User account module 110 may include, for example, information regarding an account the user has with a host website, SMS/MMS gateway, and/or WAP site such as website 48, SMS/MMS gateway 52, and/or WAP site 50. Information included in user account module 110 may be, for example, a list of media files uploaded to user information module 105, the status of the uploaded media files, how many customers accessed his or her profile and/or uploaded media file, a statement prepared for the user, and any credit or debit account balance owed or due to the user. User account module 110 may be in communication with, for example, user information module 105.

Customer information module 115 may include information regarding a customer. A customer may be any individual and/or entity requesting access to a media file. Exemplary information includes login information such as a password and user identification and/or a customer profile. A customer profile may include, for example, information regarding his or her interests, an genre of art that they contribute to, and/or information regarding media files he or she has uploaded to the user profile. Customer information module 115 may also include information regarding media files access and/or downloaded by the customer and/or a service or periodically issued media file that the customer subscribes to. Customer information module 115 may be in communication with, for example, customer account module 120 and/or media file module 125.

Customer account module 120 may include information regarding an account the user has with a host website, SMS/MMS gateway, and/or WAP site such as website 48, SMS/MMS gateway 52, and/or WAP site 50. Customer account module 120 may also include an accounting of the number of media files accessed by and/or downloaded to customer information module 115, the status of an accessed/downloaded media file, the media files and/or user profiles he or she has accessed, a statement prepared for the customer, and any credit or debit account balance owed, or due to, the customer.

Media file module 125 may include one or more media files uploaded by a user to his or her profile. A media file uploaded to media file 125 may be accessed/downloaded by a customer via, for example, customer information module 115. Exemplary media files include an MP3 file, a graphic file, a ringtone file, a document file, a game file, and a music file. Media file module 125 may be accessed by, for example, user information module 105, and/or customer information module 115.

A user and/or customer may communicate with file database 44, user information module 105, user account module 110, customer information module 115, customer account module 120, and/or media file 125 via, for example, website 48, SMS/MMS gateway 52, and/or WAP site 50 over communication links 62.

Figure 1C:
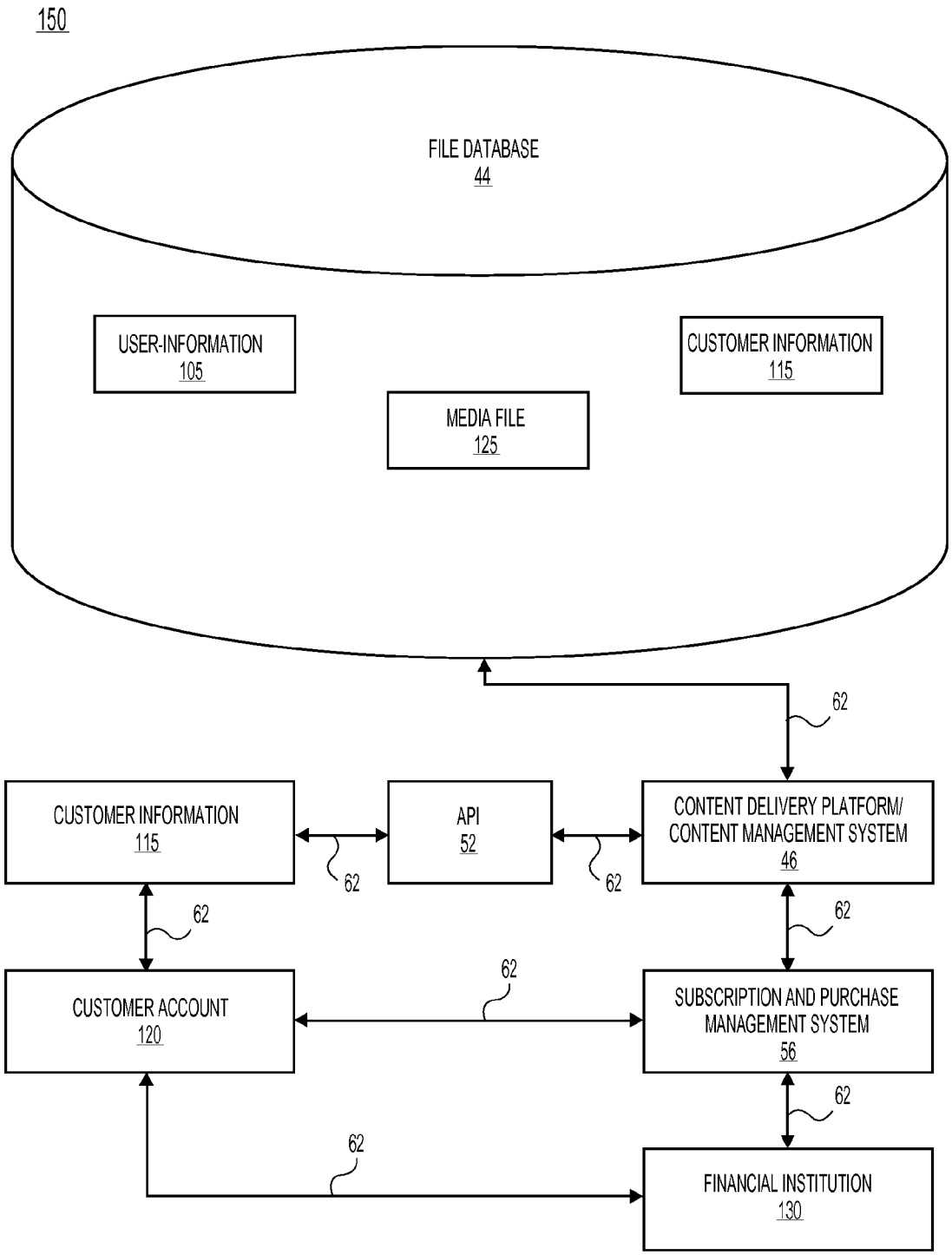
FIG. 1C is a block diagram illustrating a network system enabled to update a user and/or customer account, consistent with an embodiment of the present invention.

FIG. 1C is a block diagram illustrating a network system 150 enabled to update a user and customer account. System 150 may include file database 44, subscription and purchase management system 56, content delivery platform and content management system 46, API 52, financial institution 130, a customer information module 115, a customer account module 120, and communication links 62. File database 44 may include, for example, user information module 105, user account module 110, and media file 125.

Customer information module 115 may communicate with API 52 over communication link 62. This communication may include a request to, for example, access a user profile or access a media file. API 52 may be enabled to communicate with content delivery platform and content management system 46. This communication may include, for example, the request to, for example, access a user profile or access/download a media file and a response to the request. Content delivery platform and content management system 46 may be in communication with subscription and purchase management system 56. This communication may relate to a subscription and/or payment required from the customer to access a requested profile and/or media file. Subscription and purchase management system 56 may be in communication with customer account module 120 and/or financial institution 130 in order to, for example, execute the payment for access a requested profile and/or media file. Once executed, customer account module 120 and/or user account module 110 may be updated to reflect the transaction.

Figure 2:
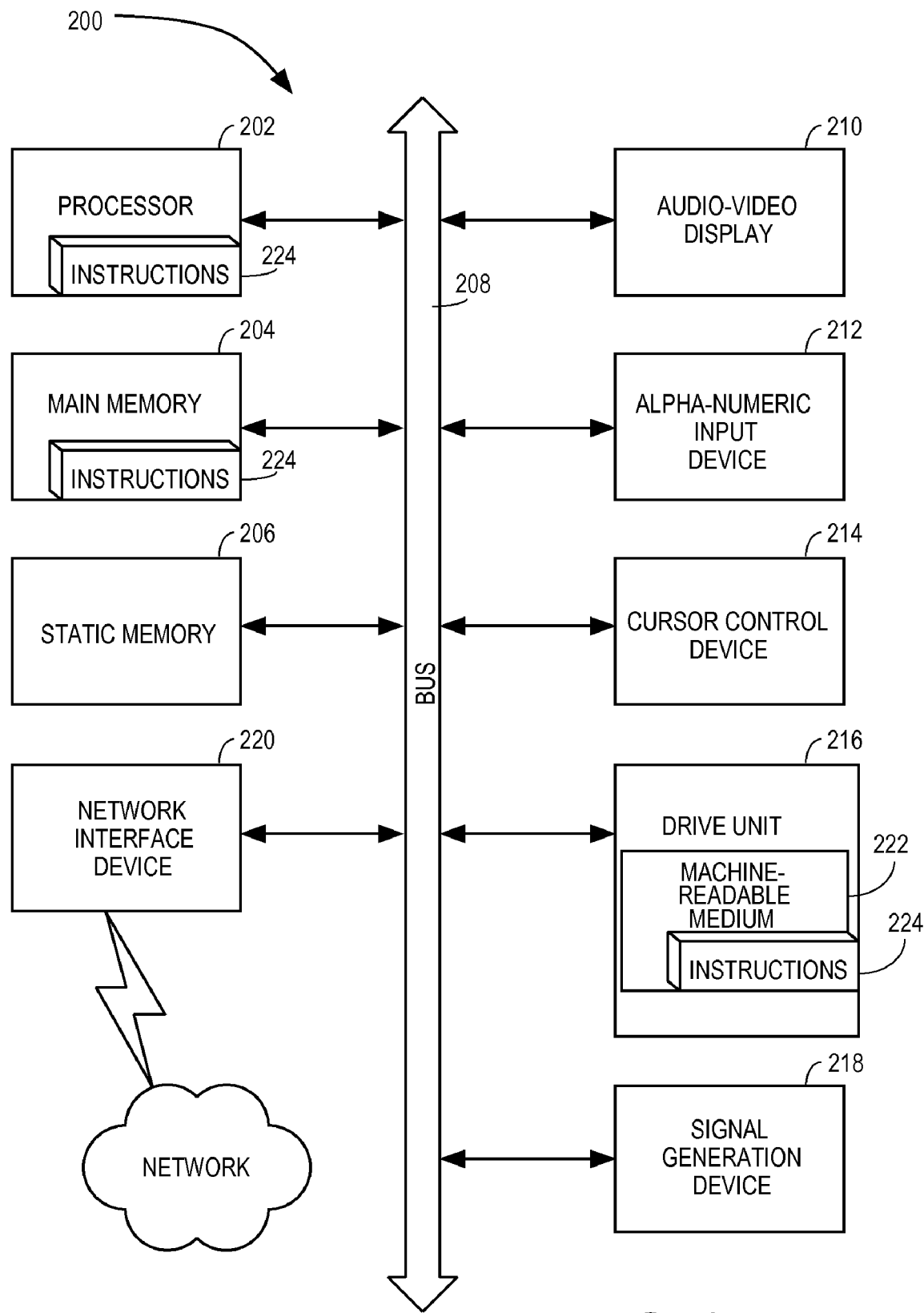
FIG. 2 is a block diagram illustrating components of a computer system, consistent with an embodiment of the present invention.

FIG. 2 shows a diagrammatic representation of a machine in the exemplary form of a computer system 200 within which a set of instructions for causing the machine to perform any one or more of the methodologies discussed herein, may be executed. In alternative embodiments, the machine may operate as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU), a graphics processing unit (GPU), or both), a main memory 204 (e.g., read only memory (ROM), flash memory, dynamic random access memory (DRAM) such as synchronous DRAM (SDRAM) or Rambus DRAM (RDRAM), etc.), and a static memory 206 (e.g., flash memory, static random access memory (SRAM), etc.), which communicate with each other via a bus 208.

The computer system 200 may further include a video display 210 (e.g., a liquid crystal display (LCD) or a cathode ray tube (CRT)). The computer system 200 may also include an alpha-numeric input device 212 (e.g., a keyboard or touch screen), a cursor control device 214 (e.g., a mouse), a disk drive unit 216, a signal generation device 218 (e.g., a speaker), and a network interface device 220.

The disk drive unit 216 includes a machine-readable medium 222 on which is stored one or more sets of instructions 224 (e.g., software) embodying any one or more of the methodologies or functions described herein. The software may also reside, completely or at least partially, within the main memory 204 and/or within the processor 202 during execution thereof by the computer system 200, the main memory 204 and the processor 202 also constituting machine-readable media.

The software may further be transmitted or received over a network 228 via the network interface device 220. Exemplary networks include Internet 30, SMS/MMS network 40, and WAP network 38.

While machine-readable medium 224 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Figure 3:
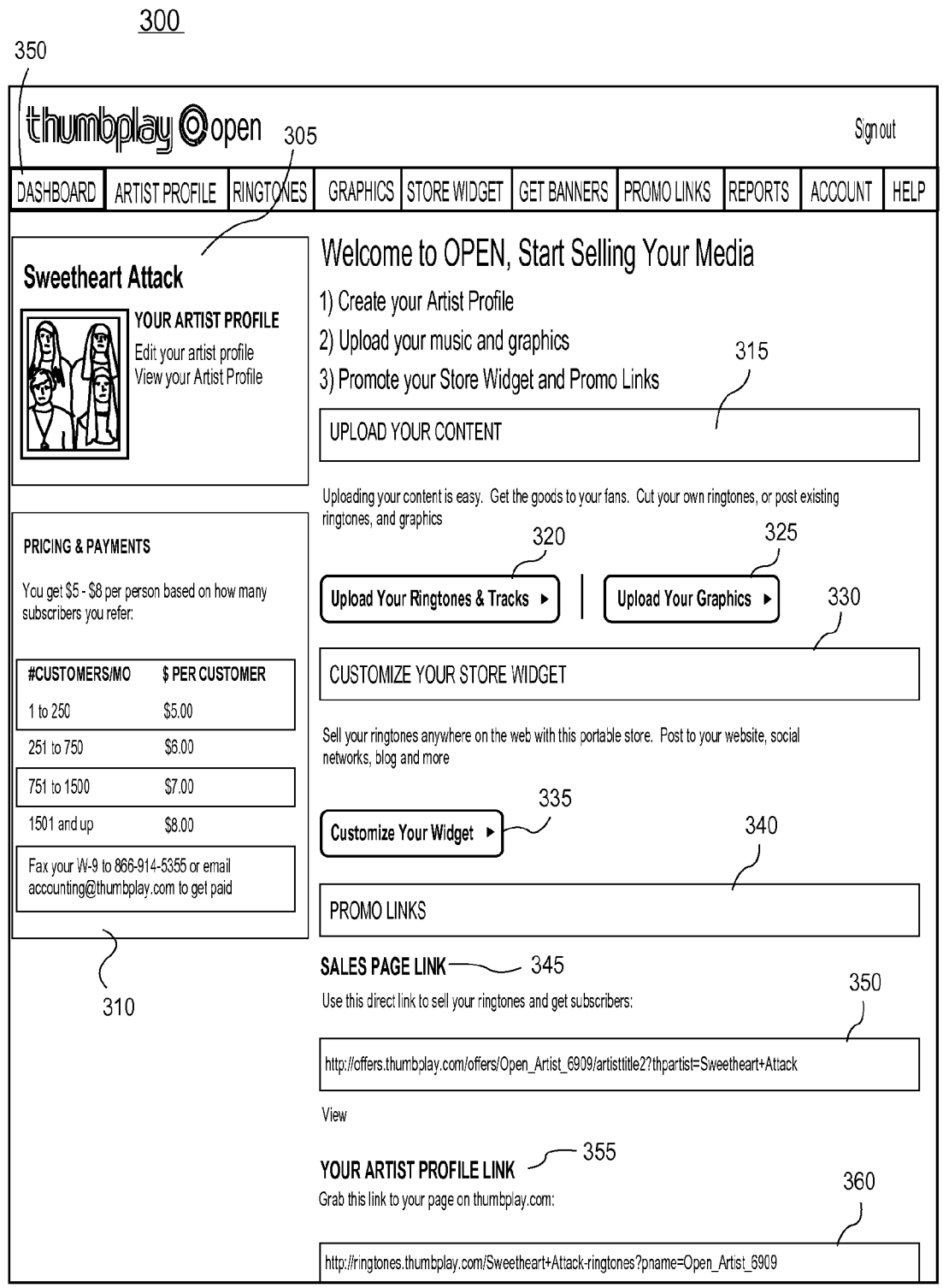
FIG. 3 is a screenshot of an exemplary page displaying a GUI for enabling a user to generate and/or modify a user profile, consistent with an embodiment of the present invention.

FIG. 3 is a screenshot of an exemplary page showing a GUI 300 for uploading and/or selling media content on a host website. The GUIs of FIGS. 3-8 may be generated, displayed, and managed by any system and/or apparatus enabled to generate them and communicate with a user such as systems 10, 100, 150, and/or 200. The term "artist" as used in FIGS. 3-8 may be broadly interpreted to mean any use of GUIs 300-800. The screenshot of FIG. 3 displays a menu of tabs across the top of the page. Selection of one of the tabs by a user may initiate the display of a GUI associated with the tab. Included in the menu of tabs is a tab for a dashboard, artist profile, ringtones, graphics, store widget, promo links, account, and help. GUI 300 may be displayed upon the selection of dashboard tab 350, or may be shown by default.

GUI 300 includes an artist profile heading 305. Information regarding an artist or user, links to view and/or edit an artist's or user's profile may be displayed under artist profile heading 305. GUI 300 may also include a pricing and payment heading 310. Information regarding the pricing of, for example, referrals, subscriptions, and other services may be provided under pricing and payment heading 310.

GUI 300 may enables a user to upload content to a user profile and/or host website. Information regarding uploading content may be shown under an upload content heading 315. For example, selection of an upload your ringtones and tracks menu button 320 or an upload your graphics button 325 may enable a user to upload a ringtone, track, or graphic media file, respectively in a manner similar to, for example, attaching a file to an e-mail, for example.

GUI 300 may also enable a user to customize a widget. Information regarding customizing a widget is shown under a customize your store widget heading 330. Customized widgets may enable a user to, for example, sell a media content file anywhere on the Web and, in this way, may act as a portable store for selling media files to one or more potential customers. Selection of the customize your widget tab 335 may initiate the display of a template widget and may enable the user to customize a template widget.

GUI 300 may provide an opportunity for a user to select and/or generate one or more promotional links. Information regarding selecting and/or generating one or more promotional links may be displayed under a promo links heading 340. A user may be enabled to add, select, and/or modify a sales page link under a sales page link heading 345. Text box 350 shows an exemplary sales page link. The sales page link shown in text box 350 may be a direct link to sell media files to customers and get subscribers to a user profile and/or host website. A user may also generate an artist profile link under a your artist profile link heading 355. An exemplary artist profile link is shown in text box 360.

Figure 4A:
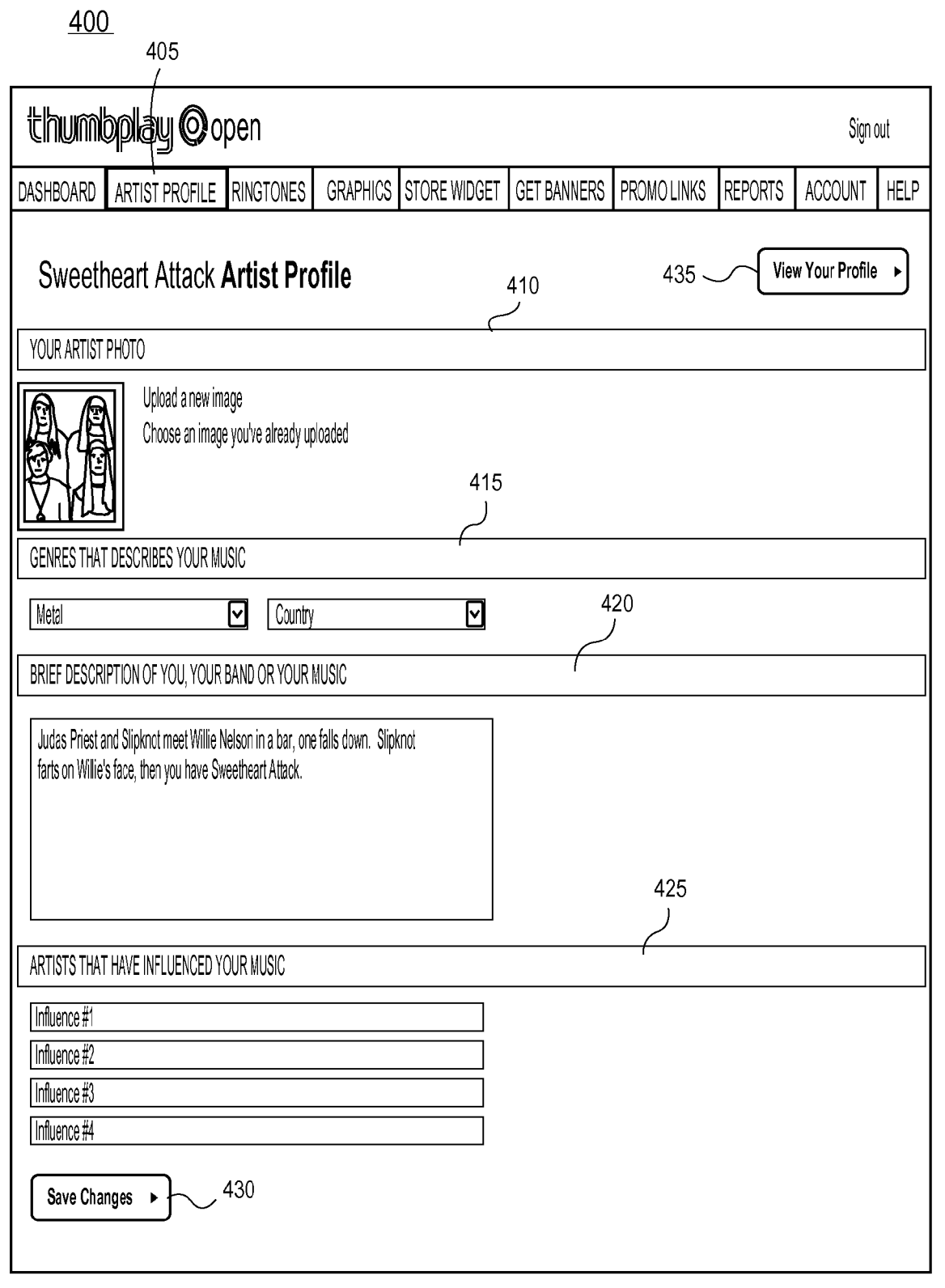

FIG. 4A is a screen shot of an exemplary page showing a GUI enabling a user to generate and/or modify an artist/user profile 400. GUI 400 may be displayed to a user upon the selection of artist profile tab 405. GUI 400 provides a platform for the generation and/or modification of an artist's/user's profile. A user/artist profile may include information regarding the genre or type of media content a user or artist uploads and/or sells. GUI 400 may include an artist/user photo header 410. Under artist/user photo header 410, information regarding a photo or graphic to be added to an artist/user profile may be provided. Such information may include a link to enable a user to upload an image or graphic or access a previously uploaded image or graphic.

GUI 400 may also enable a user to describe an aspect of themselves and/or the media associated with his or her profile. Information regarding these descriptions may be provided and/or entered under a genres that describe your music/media header 415, a brief description header 420, and/or an artists that have influenced your music header 425. Information may be entered by an artist/user via, for example, a text box or a drag-down list. Selection of save changes button 430 may enable an artist/user to save one or more changes to his or her profile.

Figure 4B:
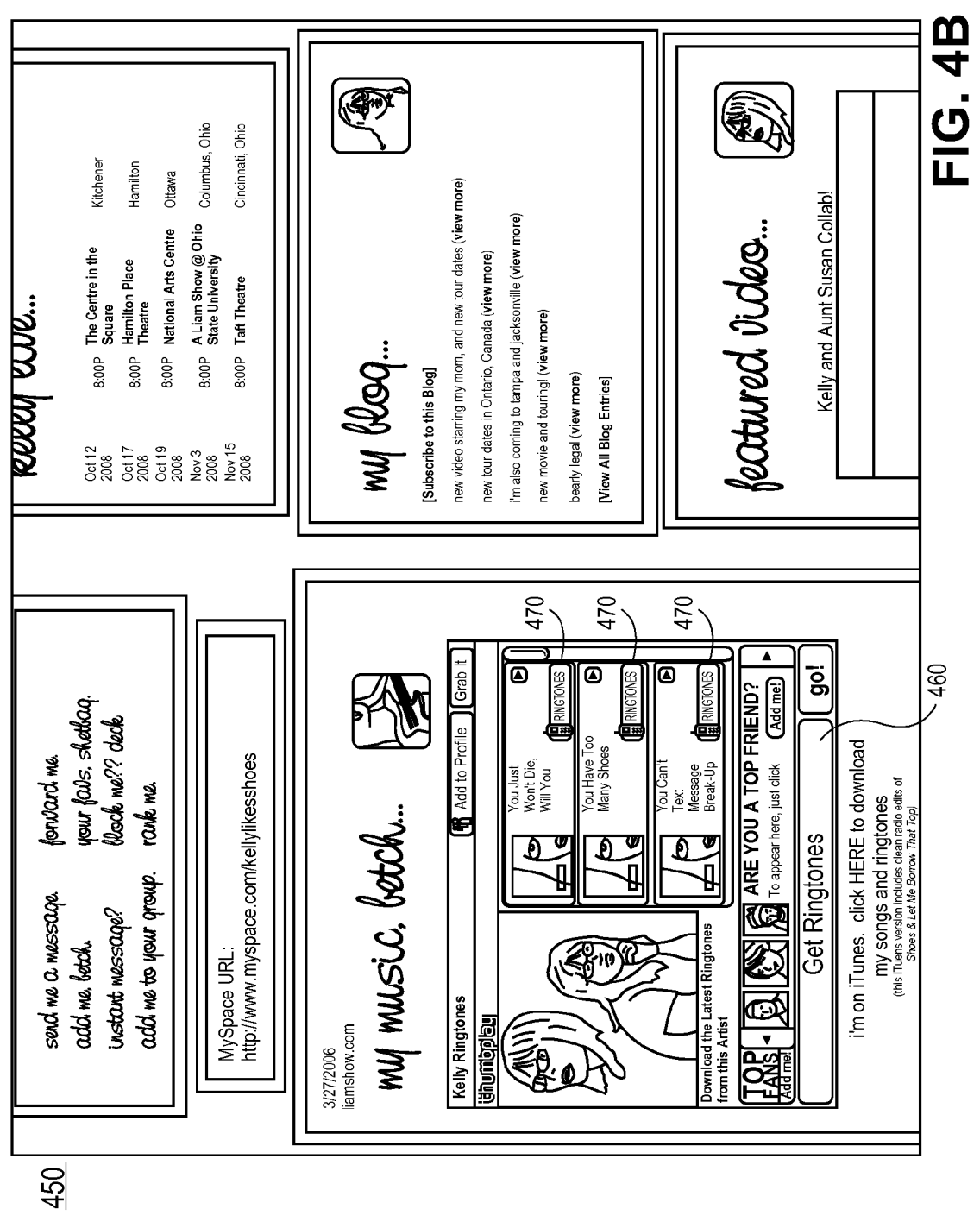

FIG. 4B is a screen shot of a page displaying an exemplary artist/user profile 450. The contents of artist/user profile 450 may include, for example, one or more media files, links, widgets, and APIs. The contents of artist/user profile 450 may be, for example, a media file to access and/or download, or a service or communication session to subscribe to, and may be offered for sale via, for example, a link, widget, and/or API.

Figure 4C:
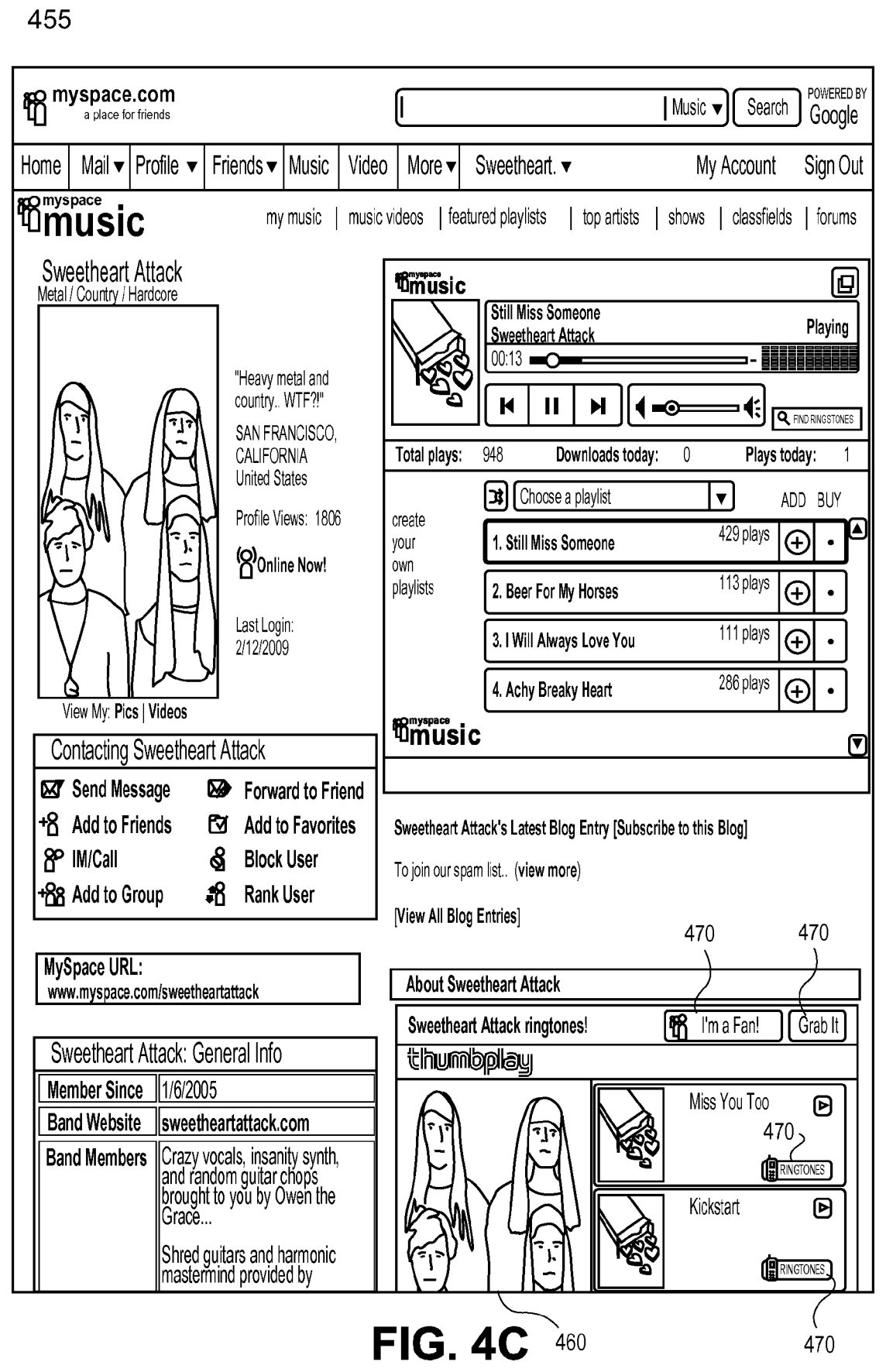

FIG. 4C is a screenshot of a page showing an exemplary GUI 455 for providing a user with a mechanism to access a user profile and/or information associated with a user profile. GUI 455 may be provided and/or displayed by, for example, a third party website, SMS/MMS gateway, and/or WAP site. GUI 455 includes a widget 460 and exemplary buttons 470. A customer may access and/or request access to a user profile and/or information associated with a user by selecting one or more of buttons 470.

FIG. 5 shows a screenshot of a page showing an exemplary GUI for enabling a user to generate, modify, and/or sell a ringtone media file 500. GUI 500 may be displayed to a user upon the selection of the ringtones tab 505. GUI 500 may include a ringtone heading 510, as well as a list of instructions 515. Exemplary instructions 515 may include instructions regarding the uploading, saving, and publishing of a ringtone media file as well as using a set of promotional information, such as a widget or a link, to promote and/or sell a ringtone media file.

GUI 500 may include information regarding unpublished ringtones under an unpublished ringtone header 520, including any ringtones the user may have generated or modified but has not published. Information regarding unpublished ringtones may include, for example, a list of unpublished ringtones as well as cover art, title, and genre associated with a ringtone media file.

GUI 500 may also include information regarding one or more ringtone media files offered for sale under a ringtones for sale header 525. This information may include, for example, cover art, a title, a genre, and/or promotional link associated with a ringtone media file for sale. A promotional link may be accessed by selection of a view URL button like view URL button 530. A ringtone media file may be added to a user profile in a manner similar to, for example, attaching a file to an e-mail via, for example, selection of an add a ringtone button such as add a ringtone button 535.

Figure 6A:
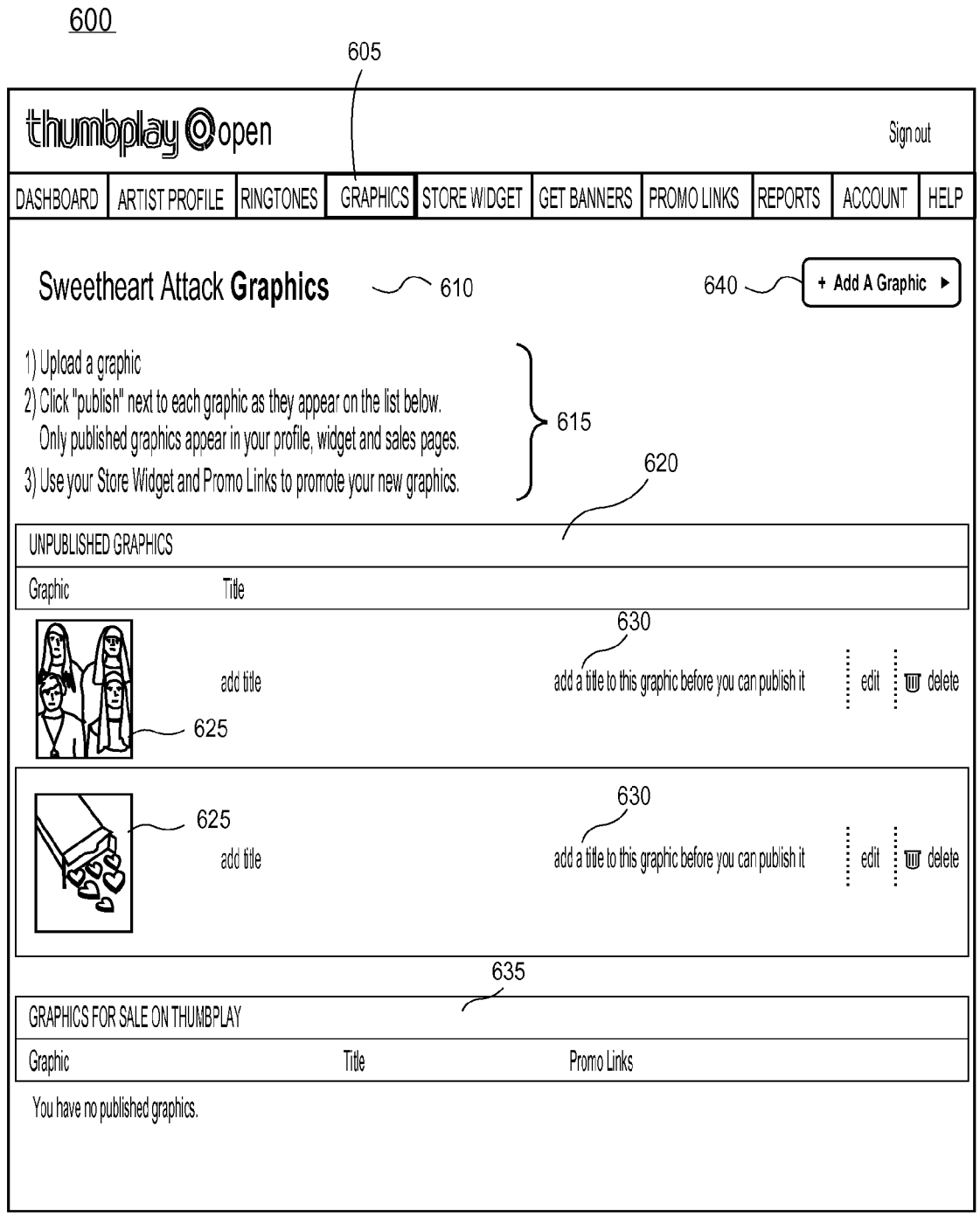
FIG. 6A is a screenshot of a page showing a exemplary GUI for enabling a user to upload, sell, and/or manage a graphic media file, consistent with an embodiment of the present invention.

FIG. 6A shows a screenshot of a page showing an exemplary GUI 600 for enabling a user to upload, sell, and/or manage a graphic media file. GUI 600 may be displayed to a user upon the selection of the graphics tab 605. GUI 600 may include a graphics heading 610, as well as an exemplary list of instructions 615. Exemplary instructions 615 may include instructions regarding the uploading, saving, and publishing of a graphic file as well as using a set of promotional information, such as a widget or a link, to promote and/or sell a graphic media file.

GUI 600 may include information regarding one or more unpublished graphic media files under an unpublished graphics header 620, such as, graphic media files the user may have generated or modified but has not published. Information regarding an unpublished graphic media file may include, for example, a list of unpublished graphics as well as cover art, title, and genre associated with an unpublished graphic media file.

A user may be enabled to add a title to an unpublished graphic media file via, for example, selection of add title link 625. A title may also be added and information related to a graphic media file may be edited or deleted upon selection of an option provided in links 630.

GUI 600 may also include information regarding one or more graphic media files offered for sale under a graphics for sale header 635. This information may include, for example, a graphic media file, a title, and/or promotional link associated with a graphic media file for sale. A graphic media file may be added to a user profile in a manner similar to, for example, attaching a file to an e-mail via, for example, selection of an add a graphic button such as add a graphic button 640.

Figure 6B:
FIG. 6B is a screenshot of a page showing a exemplary GUI for providing a user with a statement of activity regarding the user profile, consistent with an embodiment of the present invention.

FIG. 6B is a screenshot of a page showing a exemplary GUI 650 for providing a user with a statement of activity regarding the user profile. GUI 650 may be displayed to a user upon the selection of the reports tab 655. The name or title of the user profile may be displayed in heading 660.

A user may select a reporting view under a reporting view heading 665. Selecting a reporting view enables a user to view information related to a source of data associated with their user profile. For example, a user may have mechanisms for accessing their user profile available on various platforms or websites, such as mySpace.com, FaceBook.com, and/or a personal website. A user may wish to view information related to only one of these platforms. In this case, he or she would select the one of exemplary reporting views summary 666, ptrx 667, thpcampid 668, and thpcid 669, wherein each of these reporting views is associated with a different platform or website. Upon selection of a reporting view, information regarding activity related to the selected platform or website may be displayed. When a user desires to view information related to all of the platforms or websites associated with their user profile, he or she may select the summary reporting view 666. Following this selection, a summary of all activity related to the user profile may be displayed as shown in FIG. 6B.

A user may also select a manner of sorting the data shown on a report. For example, GUI 400 shows a sorting option of "by dates" 670. Other exemplary sorting options include sorting by day, week, month, or most recent activity. Optionally, one or more text boxes 670 may be displayed wherein a user may enter a date or date range for information to be shown in a statement or report. A user may select or "click on," for example, a button 675 shown on the GUI to apply the selected sorting option to the data provided on the statement or report.

Exemplary information showing activity and/or transactions regarding a user profile may be provided in table 680. Table 680 may include one or more headings that may refer to a category of information. Exemplary categories include the date, volume of traffic, and/or the number of new/existing subscriptions, and/or downloads. Information related the category and the user profile may be provided on the table under the appropriate heading.

Figure 7:
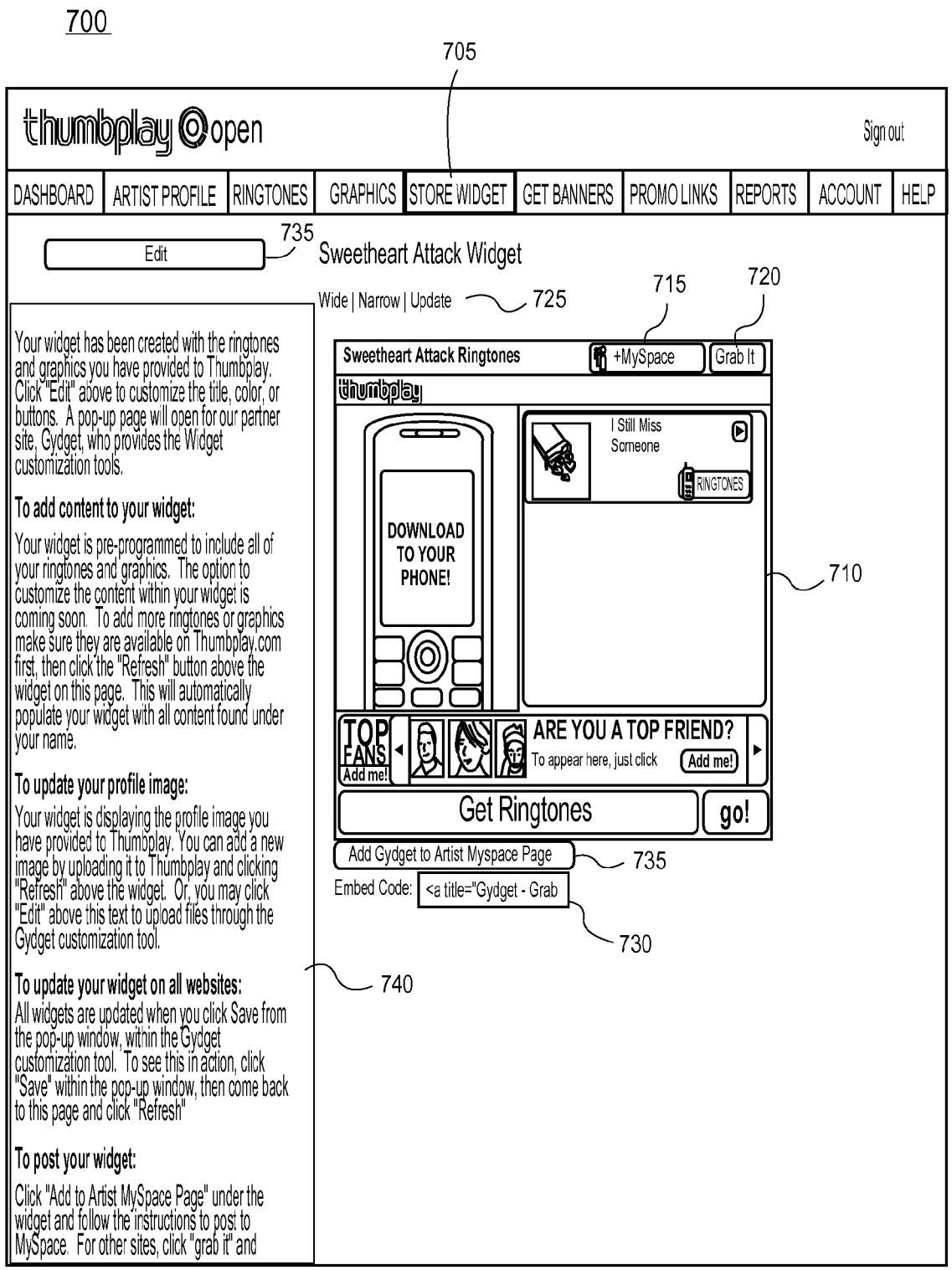
FIG. 7 is a screenshot of a page showing an exemplary GUI for enabling a user to generate, modify, and/or add a widget, consistent with an embodiment of the present invention.

FIG. 7 shows a screenshot of a page illustrating an exemplary GUI for enabling a user to generate, add, and/or modify a widget 700. GUI 700 may be displayed to a user following selection of store widget tab 705. GUI 700 may include a widget box 710. Widget box 710 may include, for example, a template or default widget. A user may be enabled to edit or modify the content and/or format of widget box 710 via, for example, selection of edit button 735. A user may also modify a widget box 710 and/or its display via selection of the wide, narrow and update menu items 710.

GUI 700 may enable a user to place a widget on a user profile, one or more websites, or an external website such as a user's home page or a social networking site like MySpace.com™ via, for example selection of an add to MySpace button 715 and/or a grab it button 720. An embedded code may be provided for widget box 710. This code may be displayed in text box 730. GUI 700 may also include an information bar 740 that may contain various instructions and information regarding the creation, editing, and/or managing a widget.

Figure 8:
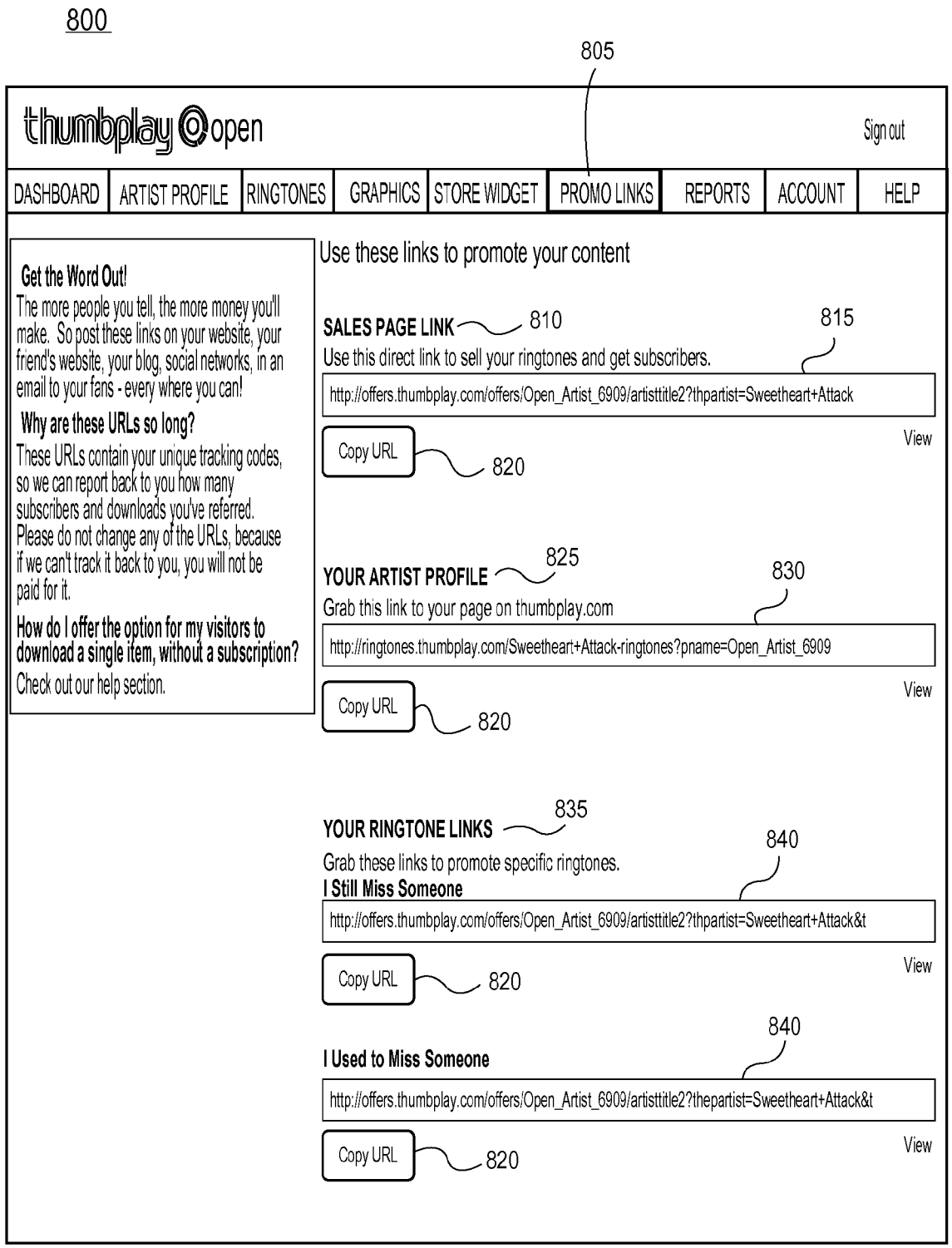
FIG. 8 is a screenshot of a page showing an exemplary GUI for enabling a user to add and/or modify a promotional link associated with a user's profile and/or media file, consistent with an embodiment of the present invention.

FIG. 8 shows a screenshot of a page illustrating an exemplary GUI 800 for enabling a user to add and/or edit a promotional link associated with a user's profile and/or media file uploaded to the user's profile. GUI 800 may be displayed following selection of promo links menu option 805. GUI 800 may enable a user to add one or more sales page links to his or her profile and/or an external website such as a user's home page or a social networking website like MySpace.com™.

GUI 800 may provide an opportunity for a user to add, select, and/or generate one or more sales links. Information regarding selecting and/or generating one or more sales links may be displayed under a sales page link heading 810. A user may be enabled to add, select, and/or modify a sales page link under sales page link heading 810. A selected and/or modified sales page link may be displayed in a text box like text box 815. Selection of a copy URL button 820 may enable a user to copy a URL displayed in a text box like text box 815 to, for example, a user's profile and/or an external webpage, like a user's home page, or social networking website like MySpace.com™.

GUI 800 may also provide an opportunity for a user to add, select, and/or generate one or more links to a user/artist profile. Information regarding adding, selecting, and/or generating one or more links to the user/artist profile may be displayed under an artist profile heading 825. A user may be enabled to add, select, and/or modify a link to the user/artist profile under artist profile heading 825. An added, selected, and/or modified link may be displayed in a text box, like text box 830. A link displayed in text box 830 may be copied to, for example, a user's profile and/or an external website such as a user's home page or a social networking website like MySpace.com™ via selection of, for example, copy URL button 820.

GUI 800 may also enable a user to create, select, and/or modify a link to a ringtone media file and add the link to his or her profile or an external website such as a user's home page or a social networking website like MySpace.com™. Information regarding creating, selecting, and/or modifying a ringtone media file may be displayed under a ringtone link header 835. A URL representing a ringtone media file may be displayed in, for example, a text box, such as text box 840. The URL representing a ringtone media file may be copied to a location selected by the user, such as his or her profile or an external website such as a user's home page or a social networking website like MySpace.com™ via selection of, for example, copy URL button 820.

Figure 9:
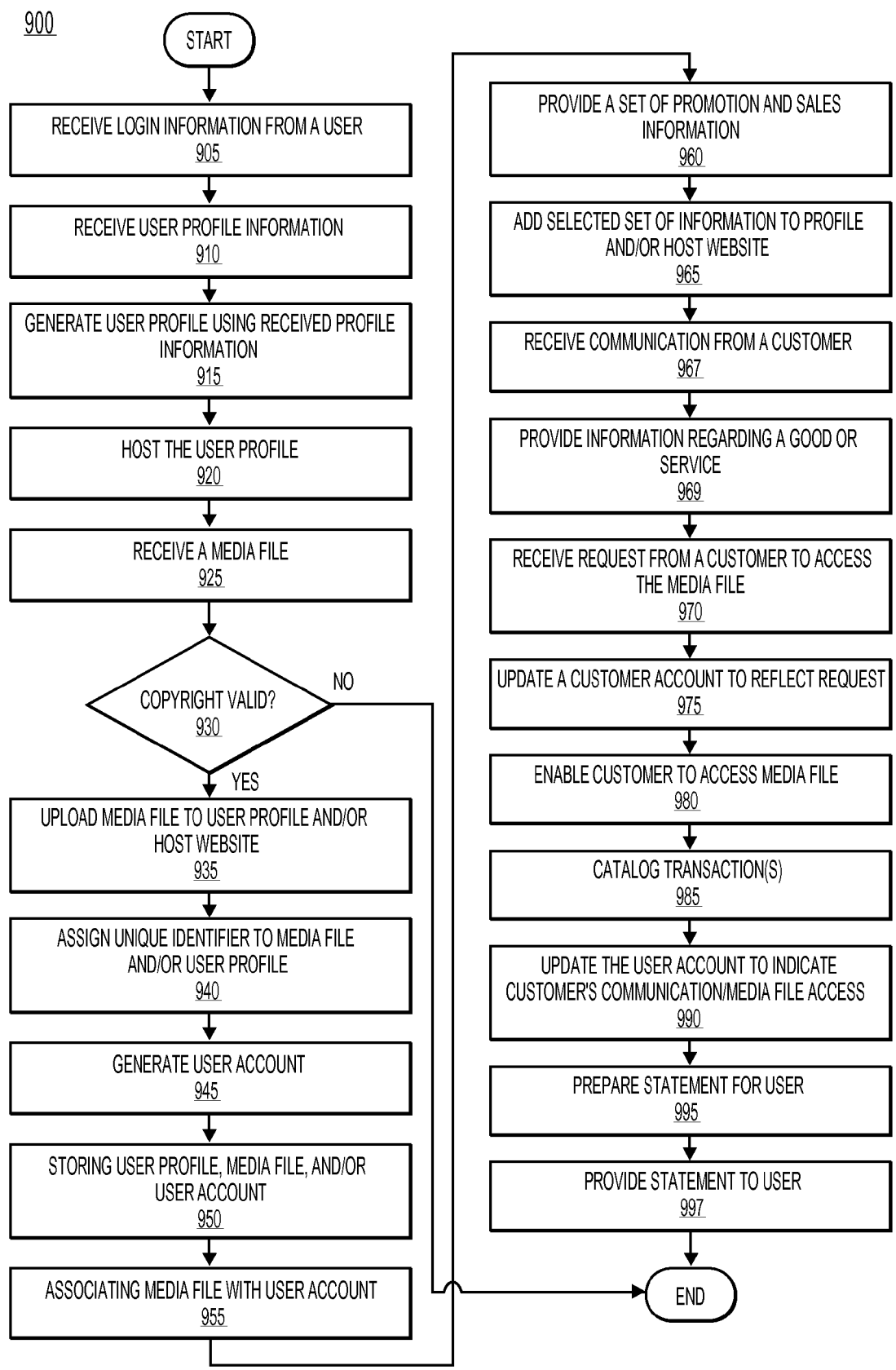
FIG. 9 is a flowchart illustrating an exemplary process for selling media content uploaded to a user profile and/or host website, consistent with an embodiment of the present invention.

FIG. 9 illustrates an exemplary process 900 for selling media content uploaded to a user profile and/or a host website. Process 900 may be performed by a system or computer readable media or apparatus enabled to sell media content uploaded to a user profile and/or a host website, such as systems 100, 101, 150, and 200.

In step 905, login information may be received from a user. In one embodiment, the user may enter login information via a user computer system such as user/customer computer system 24. Entered login information may be communicated to a website such as website 48 via the Internet 30. In another embodiment, the user may enter login information via a user mobile device such as user/customer mobile device 32. Entered login information may be communicated to an SMS/MMS gateway such as SMS/MMS gateway 52 via an SMS/MMS network like SMS/MMS network 40. Entered login information may also be communicated to a WAP site, such as WAP site 50 via, for example, a WAP network like WAP network 38. Received login information may include, for example, a user ID and a password and/or other identifying information. Received login information may be stored in, for example, a file database like file database 44, and/or a user information module like user information module 105.

In step 910, user profile information may be received via, for example, a method similar to the method of step 905. In step 915, a user profile may be generated using, for example, the received login and/or profile information. A user profile may be generated by, for example, an API, such as API 52 and/or a content delivery platform and content management system such as content delivery platform and content management system 46. In step 920, the user profile may be hosted by a hosting entity. A hosting entity may be, for example, a website, SMS/MMS gateway, and/or WAP site such as website 48, SMS/MMS gateway 52, and/or WAP site 50, respectively.

In step 925, a media file may be uploaded via, for example, a method similar to the method of step 905. Media file may be uploaded using, for example, a content delivery platform and content management system such as content delivery platform and content management system 46. Exemplary received media files include a music file, a graphic file, an MP3 file, a document file, a game file, and a ringtone file.

In step 930, it may be determined whether uploading the media file is in compliance with one or more copyright laws. This determination may include verifying that the user uploading the media file owns or has adequately licensed copyrights related to the content of the media file. The determination of step 930 may be performed by a content delivery platform and content management system such as content delivery platform and content management system 46. Exemplary methods for making the determination of step 930 include any known method of verifying copyright information such as, for instance, a three-string match or a content protection technology such as Experian™ and/or Audible Magic™ to analyze the copyright information associated with the media file. If uploading the media file is not in compliance with applicable copyright laws, then process 900 may end. If uploading the media file is in compliance with applicable copyright laws, then the media file may be uploaded to, for example, a user profile, as in step 935 using, for example, a content delivery platform and content management system such as content delivery platform and content management system.

In step 940, a unique identifier may be assigned to the uploaded media file and/or user profile by, for example, a content delivery platform and content management system such as content delivery platform and content management system 46.

In step 945, a user account may be generated. The user account may include information relating to, for example, a user's profile and/or media files associated with a user such as a statement as described with respect to step 995.

In step 950, the user profile, media file, and/or user account may be stored in, for example, a file database like file database 44. User profile may also be stored in a user information module, like user information module 105. The user account may be stored in, for example, a user account module, like user account module 110. A media file may also be stored in, for example, a media file module, like media file module 125.

In step 955, a media file may be associated with a user account using, for example, subscription and purchase management system, like subscription and purchase management system 56. In step 960, a set of promotion and/or sales information may be provided to the user via, for example, a website, a SMS/MMS gateway, and/or a WAP site, such as website 48, SMS/MMS gateway 52, and/or WAP site 50, respectively. A set of promotion and/or sales information may be prepared by, for example, a subscription and purchase management system and/or a content delivery platform and content management system such as subscription and purchase management system 56 and/or content delivery platform and content management system 46, respectively. Further details regarding promotion and sales information are provided with respect to FIG. 10.

In step 965, the user may select one or more sets of information and his or her selection may be added or uploaded to the user profile and/or host website via, for example, a website, a SMS/MMS gateway, and/or a WAP site such as website 48, SMS/MMS gateway 52, and/or WAP site 50, respectively.

In step 967, a communication may be received from a customer via, for example, a method similar to the method of step 905. A customer may be, for example, an individual, a group of individuals, or an entity in communication with an entity hosting a user profile and/or media file. The hosting entity may be, for example, a website, a SMS/MMS gateway, and/or a WAP site such as website 48, SMS/MMS gateway 52, and/or WAP site 50, respectively. The communication may establish a connection between the customer and the hosting entity. In some cases, the communication may include, for example, a request for information or access to a hosted user profile. In step 969, information regarding a good or service may be provided to the customer. This information may include, for example, an advertisement for a good or service, a recommendation for a good or service the customer may be interested in, a user profile, and a media file.

In step 970, a request may be received from a customer to access the media file via, for example, a method similar to the method of step 905. A third party user may also request to access a media file, such as third party user 60, via direct interaction with an API such as API 52 and/or a server computer system like server computer system 22. A customer may be any entity or individual wishing to purchase access to a media file on a one time, periodic, and/or as needed basis.

In step 975, a customer account may be updated to reflect the request to access the media file. A customer account may be, for example, an account with a bank, a utility provider, a mobile communications provider, a telecommunications provider, a lending institution, and an electronic commerce institution, wherein the account is associated with the customer. A customer account may be resident in, for example, a file database like file database 44 and/or a customer account module, like customer account module 120. Updating the customer account may be performed by, for example, a subscription and purchase management system, such as subscription and purchase management system 56 and/or a financial institution like financial institution 130. To update a customer's account, a payment for accessing the requested media file may be transferred from a customer and/or customer account. Updating the customer account may include, for example, an electronic funds transfer, or a credit card, debit card, or PayPal™ transaction.

In step 980, a customer may be enabled to access the requested media file via, for example, a content delivery platform and/or content management system such as content delivery platform and content management system 46 or a website, a SMS/MMS gateway, and/or a WAP site such as website 48, SMS/MMS gateway 52, and/or WAP site 50, respectively. In some embodiments, accessing the media file may include downloading the media file.

In step 985, one or more transactions of process 900 may be cataloged using, for example, a content delivery platform and content management system like content delivery platform and content management system 46. The unique identifier assigned to a media file and/or user profile in step 935 may be used to catalogue a transaction.

In step 990, a user's account may be updated to, for example, indicate a customer's communication with a hosting entity and/or access of a media file associated with his or her account and/or profile. A subscription and purchase management system, such as subscription and purchase management system 56 and/or a financial institution like financial institution 130 may be used to update the user's account. Updating a user account may include, for example, an electronic funds transfer and/or a paper check.

In step 995, a statement may be prepared for the user using, for example, a subscription and purchase management system, such as subscription and purchase management system 56 and/or a financial institution like financial institution 130. This statement may include information regarding various transactions related to the user profile, an uploaded media file, and/or a website, a SMS/MMS gateway, and a WAP site like host website 48, SMS/MMS gateway 52, and WAP site 50 including the status or cost of a transaction, and/or any credit due, or debt owed, by the user. In step 997, the statement may be provided to the user. Following step 997, process 900 may end.

Figure 10:
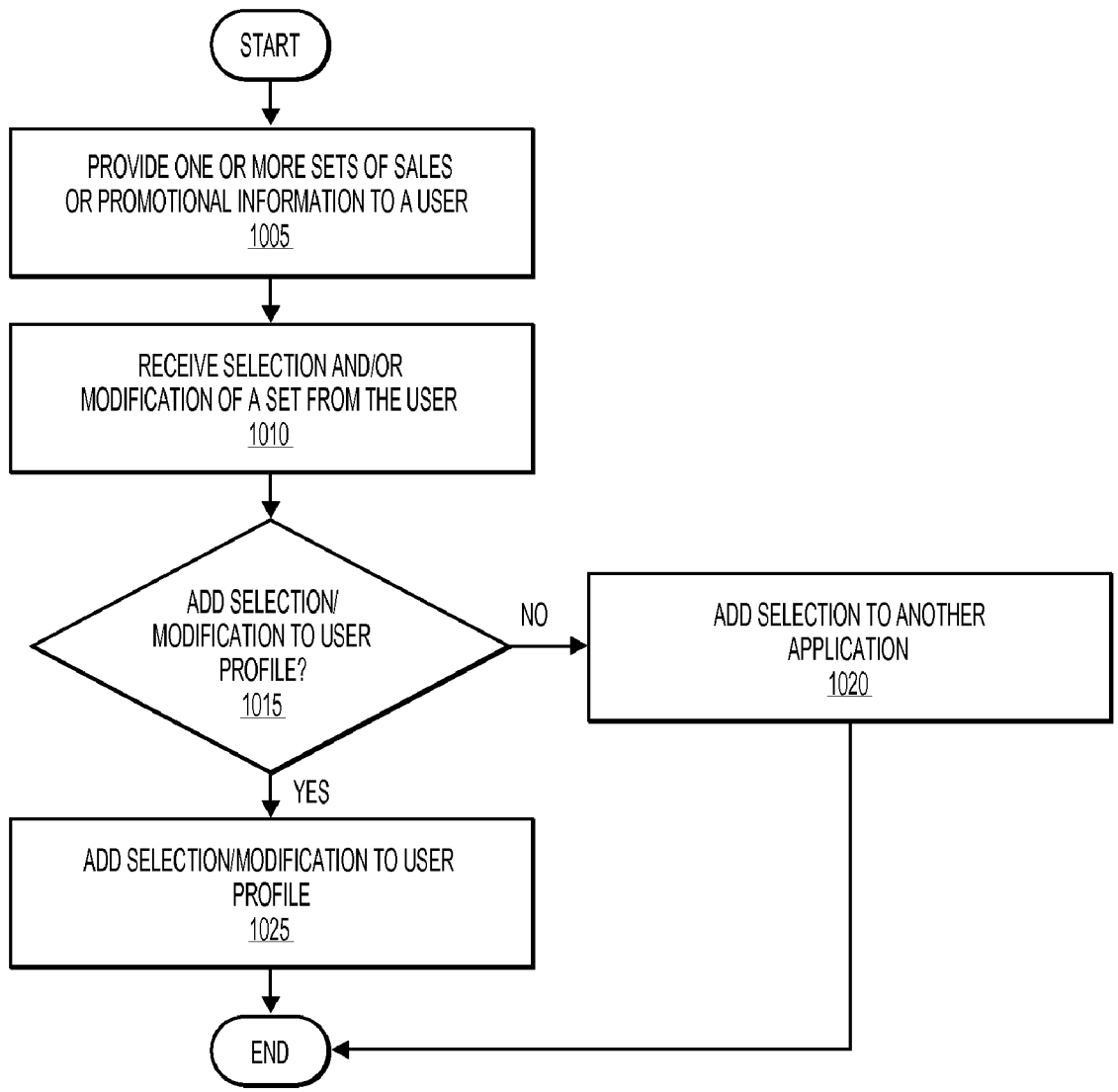
FIG. 10 is a flowchart illustrating an exemplary process for providing one or more sets of promotional and/or sales information and adding a selected set of information to a user's profile or another application, consistent with an embodiment of the present invention.

FIG. 10 illustrates an exemplary process 1000 for providing one or more sets of promotional and/or sales information and adding a selected set of information to a user's profile or another application. Process 1000 may be performed by any system and/or apparatus enabled to provide one or more sets of promotional and/or sales information and add a selected set of information to a user's profile or another application such as systems 100, 101, 150, and/or 200.

In step 1005, one or more sets of sales or promotional information may be provided to a user via a website, a SMS/MMS gateway, and a WAP site like host website 48, SMS/MMS gateway 52, and WAP site 50. Exemplary sets of sales and/or promotional information include templates for generating a widget, a link and/or an API and may be provided to assist a user in promoting and/or selling one or more media files associated with his or her profile. An exemplary widget is shown in FIG. 7 and exemplary link is shown in FIG. 8.

In step 1010, a selection and/or modification of a set of information may be received from the user via, for example, a website, a SMS/MMS gateway, and a WAP site like host website 48, SMS/MMS gateway 52, and WAP site 50. In some embodiments, a user may select one or more of the provided widget templates, links and/or APIs. Modifications to a widget template, link, and/or API may be, for example, adding, deleting, and/or modifying one or more components of the widget template, link, or API, respectively. In other embodiments, only one or a default widget template, link and/or API may be provided.

In step 1015, it may be determined whether the selection and/or modification is to be added to a user profile. This determination may be made by a user and/or a system or apparatus performing the process 1000. If the selection and/or modification is not to be added to the user profile, then it may be added to another application that is, for example, external to the host website such user's home page or a social networking website like MySpace.com™ (step 1020). In step 1025, the selection and/or modification may be added to the user profile following a determination that it is be added to the user profile. Following step 1025, process 1000 may end.

Figure 11:
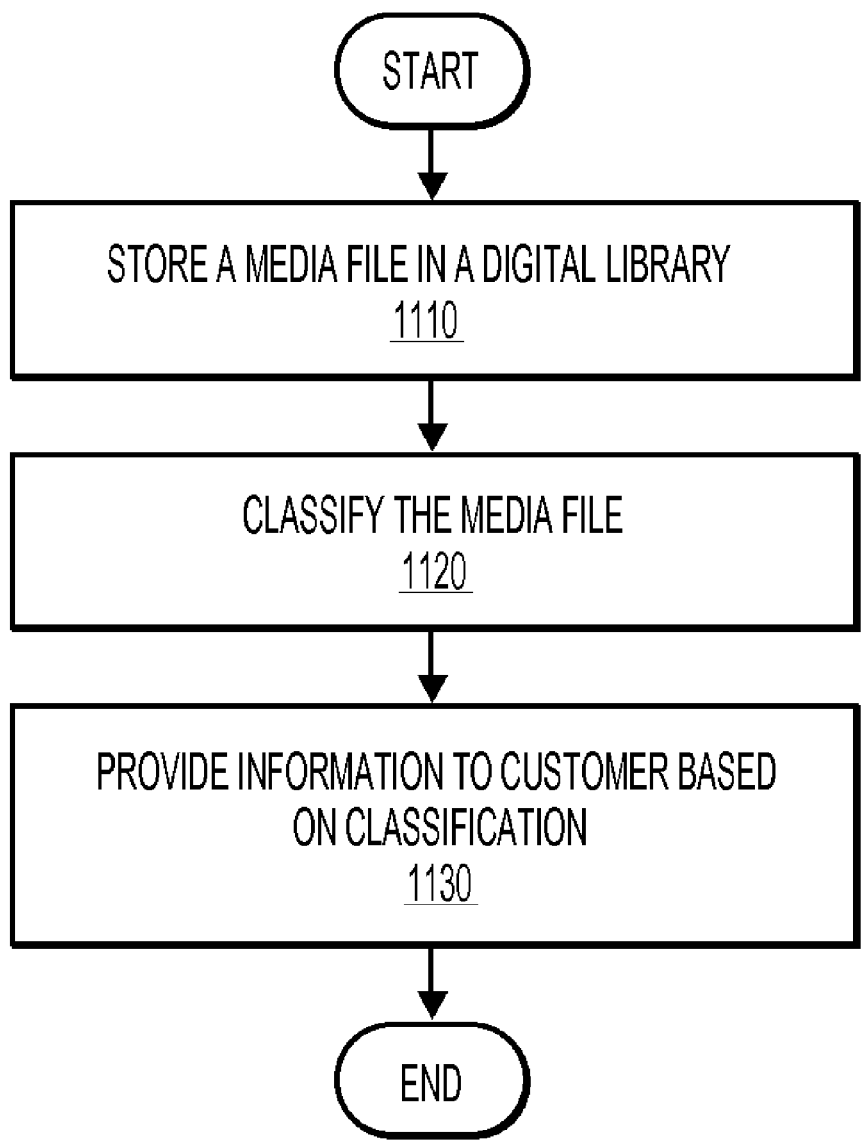
FIG. 11 is a flowchart illustrating an exemplary process for storing a media file in a digital library, consistent with an embodiment of the present invention.

FIG. 11 is a flowchart illustrating an exemplary process for storing a media file in a digital library. Process 1100 may be performed by any system and/or apparatus enabled to add and store a media file in a digital library such as systems 100, 101, 150, and/or 200.

In step 1110, a media file uploaded to a hosted user profile may be stored in a digital library. A digital library consistent with an embodiment of the present invention may be resident in, for example, a file database, like file database 44. The digital library may include media files imported directly from, for example, a media distribution company or a record label like Sony Music™ or Universal Studios™.

In step 1120, the media file may be classified into one or more categories. In some embodiments the media file may be associated with profile information and/or a user profile. In these embodiments, the profile information and/or user profile may be used to assist in classifying the media file.

In step 1130, information regarding the media file may be provided to a customer. The information may be provided based on a classification of the media file and a customer's expressed interest in the classification. The information may also be provided to the customer, for example, in response to a request for information from the customer or in accordance with a promotion of the media file sponsored by the entity hosting the user profile and/or storing the media file.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A method for enabling a customer to access to a media file uploaded by a user to a hosted user profile, the method comprising:
   receiving login information from the user via at least one of a website, a short message service (SMS)/multimedia messaging service (MMS) gateway, and a wireless application protocol (WAP) site;
   receiving profile information from the user via at least one of the website, the SMS/MMS gateway, and the WAP site;
   generating the user profile based on at least one of the received profile information and the received login information using a content delivery platform and content management system;
   hosting the user profile on at least one of the website, the SMS/MMS gateway, and the WAP site;
   generating a user account based on at least one of the received profile information and the received login information using a subscription and purchase management system;
   storing at least one of the user profile and user account in a database;
   receiving a media file from the user via at least one of the website, the SMS/MMS gateway, and the WAP site;
   uploading the media file to the user profile using the content delivery platform and content management system;
   associating the media file with the user account using the subscription and purchase management system;
   receiving a request to access the media file from a customer via at least one of the website, the SMS/MMS gateway, and the WAP site, wherein the customer is associated with a customer account;
   updating the customer account to indicate the requested access to the media file using the subscription and purchase management system;
   enabling the customer to access the media file using the content delivery platform and content management system; and
   updating the user account to indicate the customer's access of the media file using the subscription and purchase management system.

2. The method of claim 1, further comprising:
   verifying that uploading the media file complies with one or more applicable copyright laws using the content delivery platform and content management system.

3. The method of claim 1, further comprising:
   assigning a unique identifier to at least one of the user profile and the media file using the content delivery platform and content management system;
   cataloging a transaction related to at least one of the user profile and the media file based on the assigned unique identifier using the content delivery platform and content management system; and
   preparing a statement for the user based on a cataloged transaction using the subscription and purchase management system.

4. The method of claim 1, further comprising:
   providing at least one of a set of sales information and a set of promotional information to the user via at least one of the website, the SMS/MMS gateway, and the WAP site;
   receiving a selection of at least one of the set of sales information and the set of promotional information via at least one of the website, the SMS/MMS gateway, and the WAP site; and
   adding the selected set of information to the user profile using the subscription and purchase management system.

5. The method of claim 4, wherein the set of sales information and the set of promotion information is at least one of a widget, a link, and an application programming interface (API).

6. The method of claim 4, further comprising:
   receiving a modification of the selected set of information via at least one of the website, the SMS/MMS gateway, and the WAP site.

7. The method of claim 4, further comprising:
   adding the selected set of information to an application external to at least one of the hosting website, the SMS/MMS gateway, and the WAP site.

8. The method of claim 1, wherein the media file is at least one of an MP3 file, a graphic file, a ringtone file, a document file, a game file, a wallpaper file, and a music file.

9. The method of claim 1, wherein the customer accesses the media file via a mobile device.

10. The method of claim 1, wherein the customer account is an account with at least one of a bank, a utility provider, a mobile communications provider, a telecommunications provider, a lending institution, and an electronic commerce institution, wherein the account is associated with the customer.

11. The method of claim 1, further comprising:
    storing the media file in a digital library of media files.

12. The method of claim 11, further comprising:
    classifying the media file into at least one category using the received profile information.

13. The method of claim 12, further comprising:
    providing information to a customer regarding the media file based on its classification.

14. The method of claim 11, wherein the digital library includes media files imported directly from at least one of a media distribution company and a record label.

15. The method of claim 1, further comprising:
    updating the user account to indicate the customer's communication with of at least one of the website, the SMS/MMS gateway, and the WAP site hosting the media file.

16. The method of claim 1, further comprising:
    providing the customer with information regarding at least one good or service when the customer communicates with at least one of the website, the SMS/MMS gateway, and the WAP site hosting the media file.

17. The method of claim 1, wherein enabling the customer to access the media file includes: enabling the customer to download the media file.

* * * * *